United States Patent
Hanna et al.

(10) Patent No.: US 9,827,847 B1
(45) Date of Patent: Nov. 28, 2017

(54) COOLING MODULE AIRFLOW DISTRIBUTION CONTROL USING AERO SHUTTER SYSTEM

(71) Applicant: GM GLOBAL TECHNOLOGY OPERATIONS LLC, Detroit, MI (US)

(72) Inventors: Joseph Z. Hanna, Chesterfield, MI (US); Chang Yul Lee, Clawson, MI (US); Bernd Stier, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/221,063

(22) Filed: Jul. 27, 2016

(51) Int. Cl.
*B60K 11/08* (2006.01)
*B60H 1/00* (2006.01)
*B60H 1/04* (2006.01)

(52) U.S. Cl.
CPC ........ *B60K 11/085* (2013.01); *B60H 1/00314* (2013.01); *B60H 1/00335* (2013.01); *B60H 1/04* (2013.01)

(58) Field of Classification Search
CPC .... B60K 11/08; B60K 11/085; B60H 1/00314
See application file for complete search history.

(56) References Cited

U.S. PATENT DOCUMENTS 8,091,516 B2 * 1/2012 Preiss .................... B60K 11/04
123/41.05

* cited by examiner

*Primary Examiner* — Erez Gurari
(74) *Attorney, Agent, or Firm* — Quinn IP Law

(57) ABSTRACT

A shutter system includes a housing, and a plurality of shutters coupled to the housing. Each of the shutters is rotatable about a respective rotation axis, between a first position and a second position. At least one actuator is attached to the housing, and is coupled to at least one of the shutters for moving that shutter between its respective first position and second position. Each of the shutters define a first angle relative to a reference axis when disposed in their respective first position, and a second angle relative to the reference axis when disposed in their respective second position. The first angle of each of the shutters is substantially equal to the first angle of all other of the shutters. The second angle of at least one of the shutters is different than the second angle of at least another of the shutters.

15 Claims, 5 Drawing Sheets

COOLING MODULE AIRFLOW DISTRIBUTION CONTROL USING AERO SHUTTER SYSTEM

TECHNICAL FIELD

The disclosure generally relates to a shutter system for controlling airflow to a forward cooling module of a vehicle, and a method of controlling the shutter system.

BACKGROUND

Vehicles include a body, which typically defines an air inlet disposed at a front end of the body. For example, the air inlet may allow air to flow into an engine compartment of the body. The air flows through the air inlet and across a cooling module to cool one or more different fluids. The cooling module may include, for example, a radiator to cool an engine coolant, a condenser to cool a refrigerant of a cabin air cooling system, and/or a charge air cooler for cooling combustion air.

In order to increase a fuel efficiency of the vehicle, some vehicles have incorporated an active shutter system adjacent to the air inlet to regulate the flow of air through the air inlet. The shutter system may move between an open position and a closed position. The open position allows the flow of air through the air inlet, and the closed position blocks the flow of air through the air inlet. An actuator may move the shutters between the open position and the closed position under pre-determined operating conditions to optimize the fuel efficiency of the vehicle.

SUMMARY

A vehicle is provided. The vehicle includes a body defining an air inlet, and a plurality of shutters coupled to the body. Each of the plurality of shutters is rotatably moveable about a respective rotation axis. At least one of the plurality of shutters is positionable at a different angle relative to its respective rotation axis, relative to a position of at least one other of the plurality of shutters relative to its respective rotation axis.

A shutter system for controlling airflow through a cooling module of a vehicle is also provided. The shutter system includes a housing, and a plurality of shutters coupled to the housing. Each of the plurality of shutters is rotatably moveable about a respective rotation axis between a first position and a second position. At least one actuator is attached to the housing, and is coupled to at least one of the plurality of shutters for moving the at least one shutter between its respective first position and second position. Each of the plurality of shutters defines a first angle relative to a reference axis when disposed in its respective first position, and a second angle relative to the reference axis when disposed in its respective second position. The first angle of each of the plurality of shutters is substantially equal to the first angle of all other of the plurality of shutters. The second angle of at least one of the plurality of shutters is different than the second angle of at least another of the plurality of shutters.

A method of controlling a shutter system for a cooling module of a vehicle is also provided. The shutter system includes a plurality of shutters, with each of the plurality of shutters rotatably moveable about a respective rotation axis between a first position and a second position. The method includes determining, with a cooling module controller, if at least one operating parameter of the vehicle is currently equal to a first state, a second state, or a third state. When the at least one operating parameter is currently equal to the second state, the cooling module controller controls movement of each of the plurality of shutters into a respective second position. When disposed in their respective second position, each of the plurality of shutters defines a second angle relative to a reference axis. The second angle of at least one of the plurality of shutters is different than the second angle of at least another of the plurality of shutters to optimize airflow across a first specific region of the cooling module.

Accordingly, the shutter system positions at least one of the individual shutters at a different angle relative to the other shutters and/or a reference axis to optimize airflow to a specific region of the cooling module for specific operating conditions. For example, during operation of the vehicle in high ambient air temperatures, the shutters may be individually angled relative to each other and/or the reference axis to direct airflow to a sub-cooling region of a condenser of the cooling module to enhance cabin air cooling performance. Alternatively, during wide open throttle conditions, the shutters may be individual angled relative to each other and/or the reference axis to direct airflow to the charged air cooler to enhance engine performance.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is shown generally at 20. The vehicle 20 may include any moveable platform that uses a flow of ambient air to cool one or more fluids. For example, the vehicle 20 may include, but is not limited to, an automobile, a truck, a tractor, an airplane, an ATV, etc.

Figure 1:
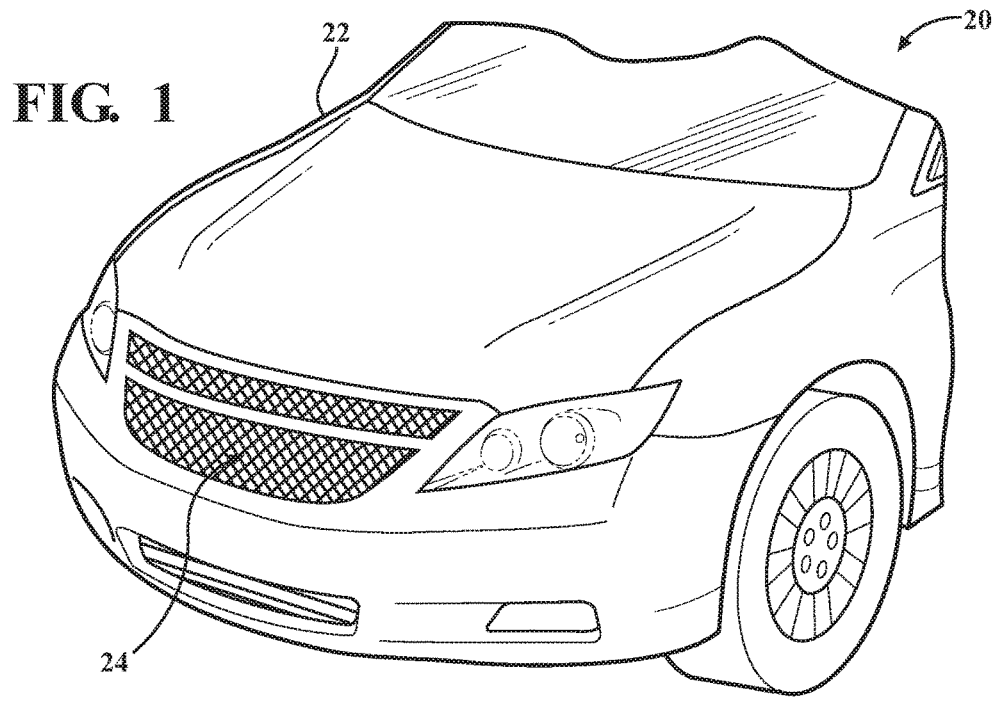
FIG. 1 is a schematic perspective view of a vehicle.
Figure 2:
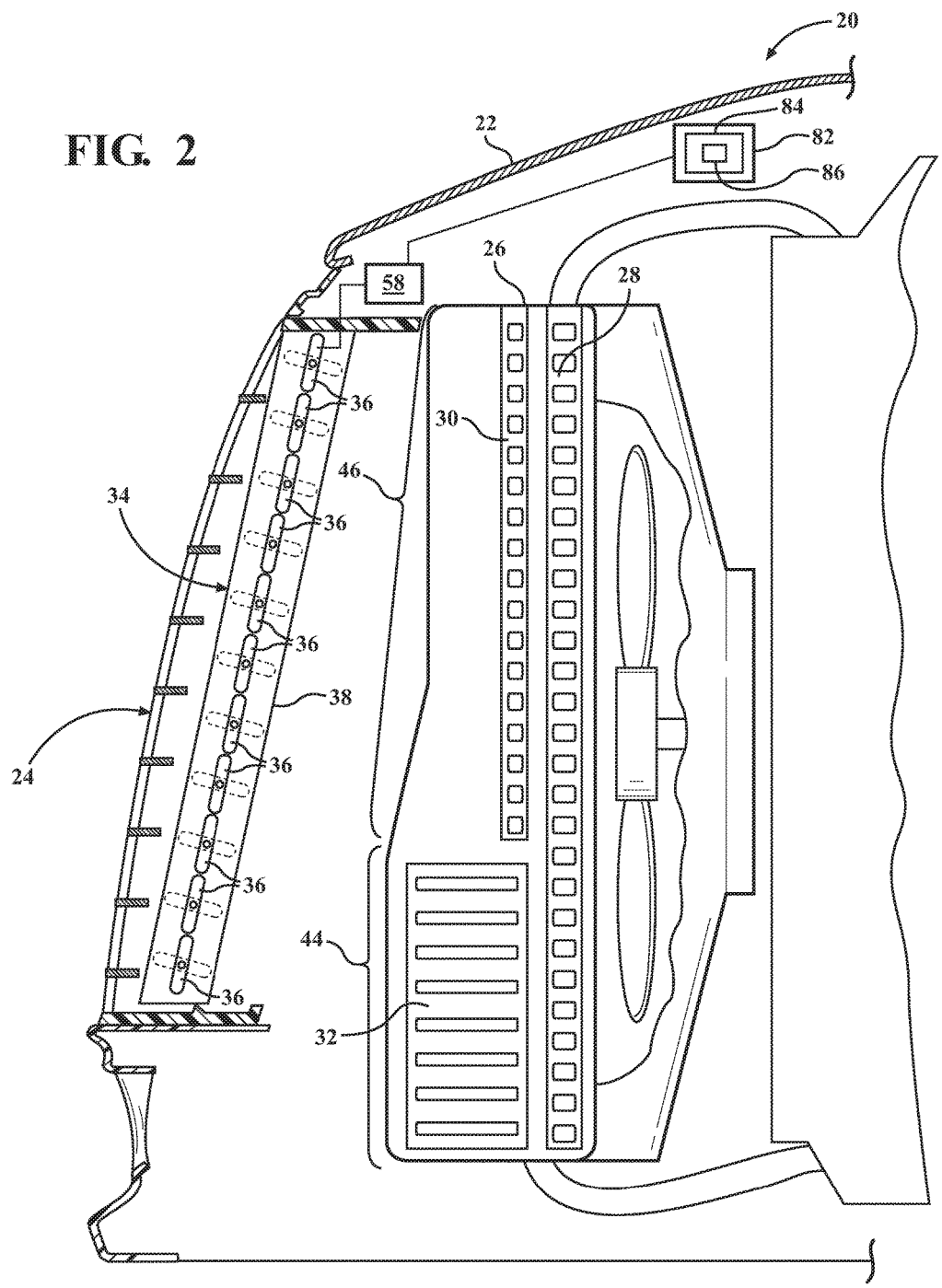
FIG. 2 is a fragmentary schematic cross sectional view of the vehicle showing a shutter system.

Referring to FIGS. 1 and 2, the vehicle 20 includes a body 22 that defines an air inlet 24. The air inlet 24 is configured for allowing air to pass therethrough. The air inlet 24 may be positioned at a front of the body 22, and disposed forward or upstream of a cooling module 26 (shown in FIG. 2). However, it should be appreciated that the air inlet 24 may be disposed at any location on the body 22, and is not limited to the front or forward end of the vehicle 20. The air inlet 24 may be sized and/or shaped in any suitable manner capable of meeting any airflow and/or aesthetic design considerations of the vehicle 20. Additionally, the air inlet 24 may include a plurality of air inlets 24 disposed adjacent each other, including but not limited to the openings in a front grille of the vehicle 20.

The cooling module 26 may include, but is not limited to, at least one of a radiator 28 for cooling an engine coolant, a condenser 30 for cooling a refrigerant of an air cabin cooling system, and/or a charge air cooler 32 for cooling a flow of combustion air. As is known in the art, the radiator 28, the condenser 30, and the charge air cooler 32 are heat exchangers that exchange heat from a respective fluid to a flow of ambient air moving across the respective heat exchanger, for cooling the respective fluid. Accordingly, proper functionality of the respective heat exchangers, i.e., the radiator 28, the condenser 30, and/or the charge air cooler 32, requires an adequate flow of air to remove the heat from the respective fluid.

Referring to FIG. 2, the vehicle 20 includes a shutter system 34 for controlling airflow through the air inlet 24. The shutter system 34 is positioned adjacent the air inlet 24, downstream of the airflow for which the shutter system 34 is to control. For example, the shutter system 34 may be positioned downstream of the air inlet 24 and upstream of the cooling module 26 in order to control airflow to the cooling module 26. The shutter system 34 includes a plurality of shutters 36. The shutters 36 are coupled to and supported by the body 22, or some other structural component of the vehicle 20. The shutter system 34 may include a housing 38 that supports the shutters 36. The housing 38 in turn may be attached to the body 22 of the vehicle 20. As used herein, the body 22 of the vehicle 20 should be interpreted to include not only the panels forming the exterior shape of the vehicle 20, but may also include one or more structural components of the vehicle 20 to which the panels are attached, such as a frame rail, a cross member, etc. As shown in the exemplary embodiment of the Figures, the shutters 36 extend across a width of the vehicle 20, and are generally transverse to a longitudinal axis of the vehicle 20, for controlling airflow through the air inlet 24 at the front of the vehicle 20 in a longitudinal direction of travel of the vehicle 20.

Figure 3:
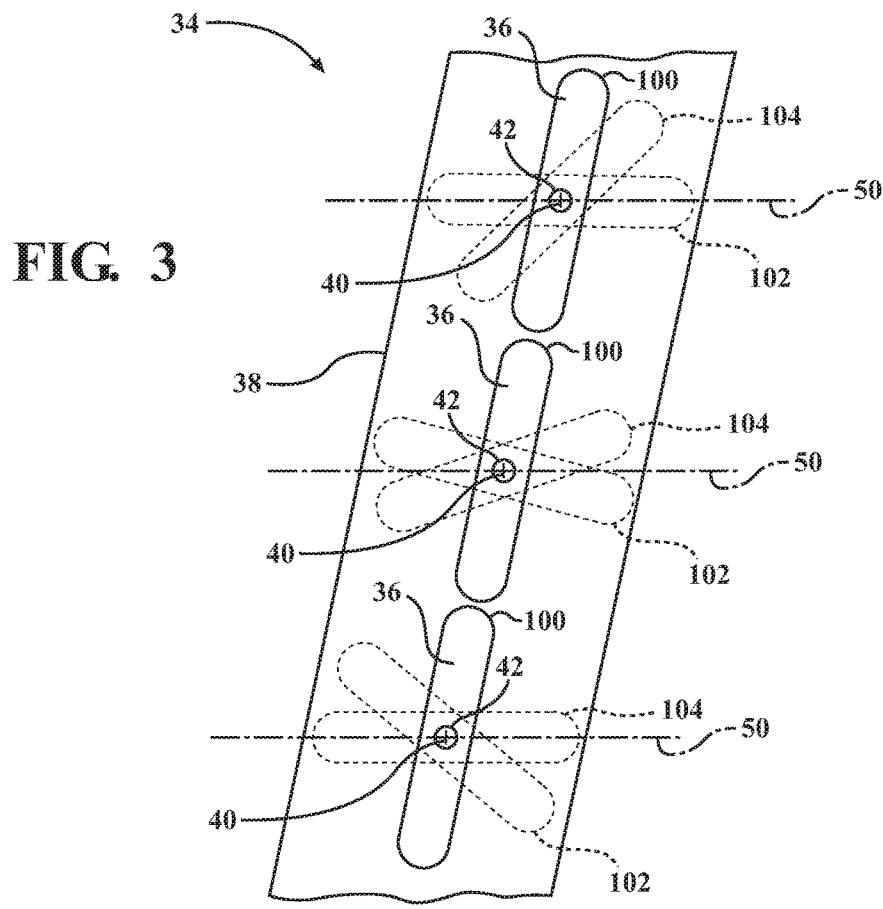
FIG. 3 is a schematic cross sectional view of the shutter system.

Referring to FIG. 3, the shutters 36 are rotatably supported for rotation about a respective rotation axis 40. The shutters 36 may be attached to the housing 38 and/or the body 22 in any suitable manner that enables rotation of each individual shutter 36 about a respective rotation axis 40. For example, each individual shutter 36 may be supported by a shaft or axle 42, which is in turn attached to the housing 38. Each of the plurality of shutters 36 is rotatably moveable about their respective rotation axis 40 between at least a first position, shown in solid at 100, and a second position, shown in phantom at 102. In other embodiments, each of the shutters 36 is rotatably moveable about their respective rotation axis 40 to an additional third position, shown in phantom at 104. It should be appreciated that the shutters 36 may be positioned in additional positions in accordance with the teachings of this disclosure. In some embodiments, the shutters 36 may move simultaneously, in unison. In other embodiments, the shutters 36 may move independently of each other.

Referring to FIG. 3, and as used herein, the respective first position 100 for each of the shutters 36 is defined as a closed position for blocking airflow through the air inlet 24, the respective second position 102 for each of the shutters 36 is defined as a fully open position for allowing maximum airflow through the air inlet 24 and/or directing the airflow through the air inlet 24 into a specific first region 44 of the cooling module 26, and the respective third position 104 for each of the shutters 36 is defined as a partially open position for allowing reduced airflow through the air inlet 24 and/or directing the airflow through the air inlet 24 into a specific second region 46 of the cooling module 26. It should be appreciated that the first position 100, the second position 102, and the third position 104 may be defined differently than described herein.

Figure 4:
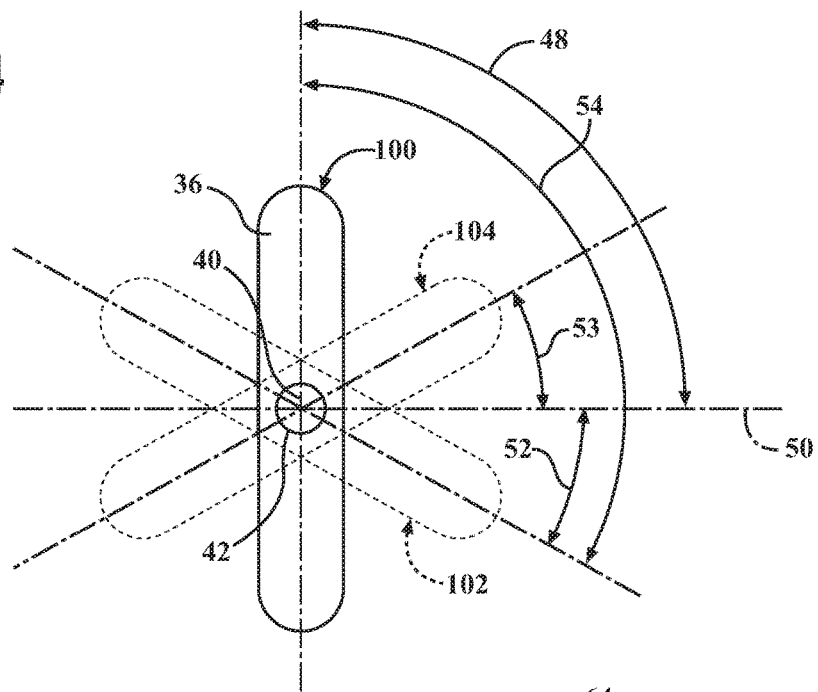
FIG. 4 is a schematic, enlarged, cross sectional view of the shutter system showing a single shutter thereof.

Referring to FIG. 4, each of the shutters 36 define a respective first angle 48 relative to a reference axis 50 when disposed in their respective first position. The reference axis 50 may be defined as, for example, the longitudinal axis of the vehicle 20. The first angle 48 is the angle formed between a respective shutter 36 and the reference axis 50, on a vertical plane that is normal to a ground surface and passes through the reference axis 50. Each of the shutters 36 define a respective second angle 52 relative to the reference axis 50 when disposed in their respective second position. The second angle 52 is the angle formed between a respective shutter 36 and the reference axis 50, on the vertical plane that is normal to the ground surface and passes through the reference axis 50. Each of the shutters 36 may further define a respective third angle 53 relative to the reference axis 50 when disposed in their respective third position. The third angle 53 is the angle formed between a respective shutter 36 and the reference axis 50, on the vertical plane that is normal to the ground surface and passes through the reference axis 50. The first angle 48, the second angle 52, and the third angle 53 may each be a positive angle, or a negative angle. As shown in the Figures and as described herein, a positive angle is an angle that is above the reference axis 50 as shown in FIG. 4, and a negative angle is an angle that is below the reference axis 50 as shown in FIG. 4. As shown in FIG. 4, the first angle 48 and the third angle 53 are represented as positive angles, whereas the second angle 52 is represented as a negative angle.

As described herein and as noted above, the first position is defined as a closed position. Accordingly, referring to FIG. 4, the first angle 48 of each of the shutters 36 is shown as being approximately equal to ninety degrees, i.e., generally vertical, in order to block airflow through the air inlet 24. As best shown in FIG. 3, the first angle 48 of each of the shutters 36 is substantially equal to the first angle 48 of all of the other shutters 36 in the shutter system 34. As such, when all of the shutters 36 are disposed in their respective first position, the shutters 36 are all oriented at substantially the same angle relative to the longitudinal axis. Accordingly, the first angle 48 of each respective shutter 36 varies no more than five degrees from the first angle 48 of all of the other shutters 36. More preferably, the first angle 48 of each respective shutter 36 varies no more than one degree from the first angle 48 of all of the other shutters 36.

Referring to FIG. 4, each of the plurality of shutters 36 rotates about its respective rotation axis 40 a respective angle of rotation 54 when moving between its respective first position 100 and second position 102. All of the shutters 36 may rotate between their respective first position 100, second position 102, and third position 104, simultaneously and in unison, or may alternatively rotate independently of each other. As noted above, and as described herein, the second position 102 is defined as a fully opened position that directs airflow to a first region 44 of the cooling module 26. Accordingly, the respective angle of rotation 54 of each shutter 36 is the maximum rotation of each individual shutter 36. Since the first angle 48 of each respective shutter 36 is substantially equal to the first angle 48 of all of the other shutters 36, the respective angle of rotation 54 for each respective shutter 36 will depend upon the second angle 52 of each respective shutter 36. Referring to FIG. 3, the second angle 52 of at least one of the shutters 36 is different than the second angle 52 of at least another of the shutters 36 to direct airflow in different directions relative to the reference axis 50. Accordingly, the angle of rotation 54 of at least one of the shutters 36 is different than the angle of rotation 54 of at least another of the shutters 36.

As shown in FIG. 3, the second angle 52 of each of the shutters 36 may be different than the second angle 52 of any other of the plurality of shutters 36. As such, each of the shutters 36 may define a different second angle 52, and each of the shutters 36 may define a different angle of rotation 54. Alternatively, the shutters 36 may be combined to form groups. For example, a first group of shutters 36 may all have the same second angle 52 and the same angle of rotation 54 as all of the other shutters 36 in the first group, and a second group of shutters 36 may all have the same second angle 52 and the same angle of rotation 54 as all of the other shutters 36 in the second group. The second angle 52 of the shutters 36 in the first group may be different than the second angle 52 of the shutters 36 in the second group.

The plurality of shutters 36 cooperate to control airflow through the cooling module 26. Accordingly, the first group of the shutters 36 may direct airflow toward the first region 44 of the cooling module 26 when disposed in their respective second position, and the second group of the shutters 36 may direct airflow toward the second region 46 of the cooling module 26 when disposed in their respective second position. In so doing, the airflow may be directed across the entire cooling module 26.

In other embodiments, each of the shutters 36 may have a separate and distinct second angle 52, so that all of the shutters 36 cooperate to direct airflow into the same region of the cooling module 26. In so doing, the respective second angle 52 of each of the shutters 36 may be customized to optimize airflow to a specific region of the cooling module 26, e.g., the first region 44 or the second region 46. If the shutters 36 are configured to provide the third position, then the second position may be configured to direct airflow onto the first region 44 of the cooling module 26 for a second vehicle 20 operating condition, and the third position may be configured to direct airflow onto the second region 46 of the cooling module 26 for a third vehicle 20 operating condition.

Figure 5:
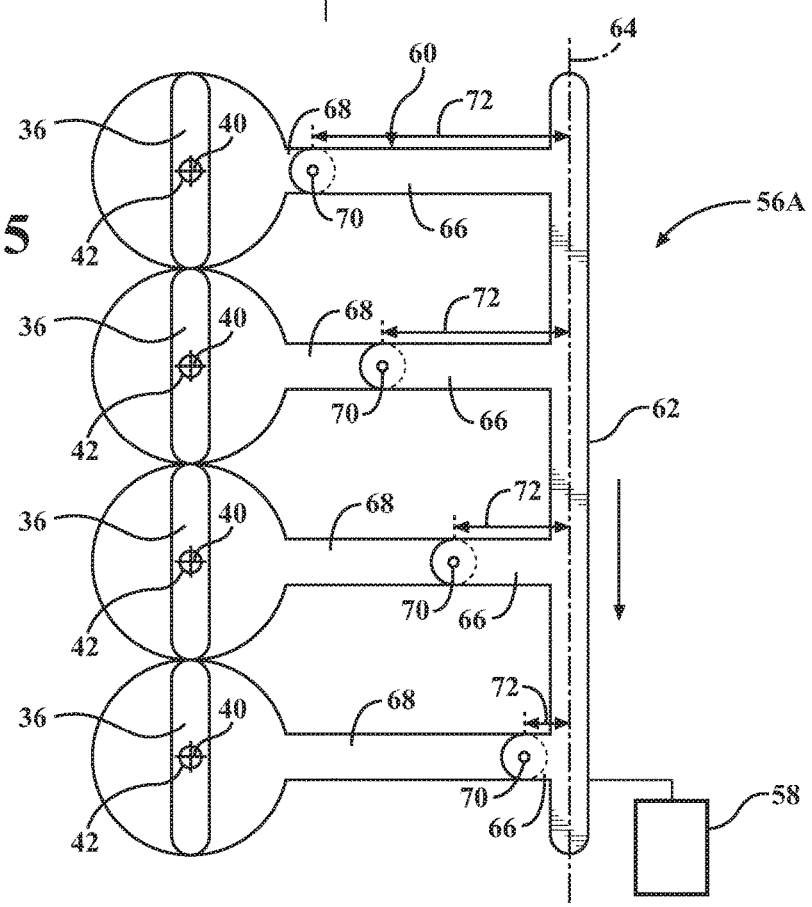
FIG. 5 is a schematic cross sectional view of the shutter system in a first position, showing a first embodiment of an actuation system for actuating the shutter system.
Figure 6:
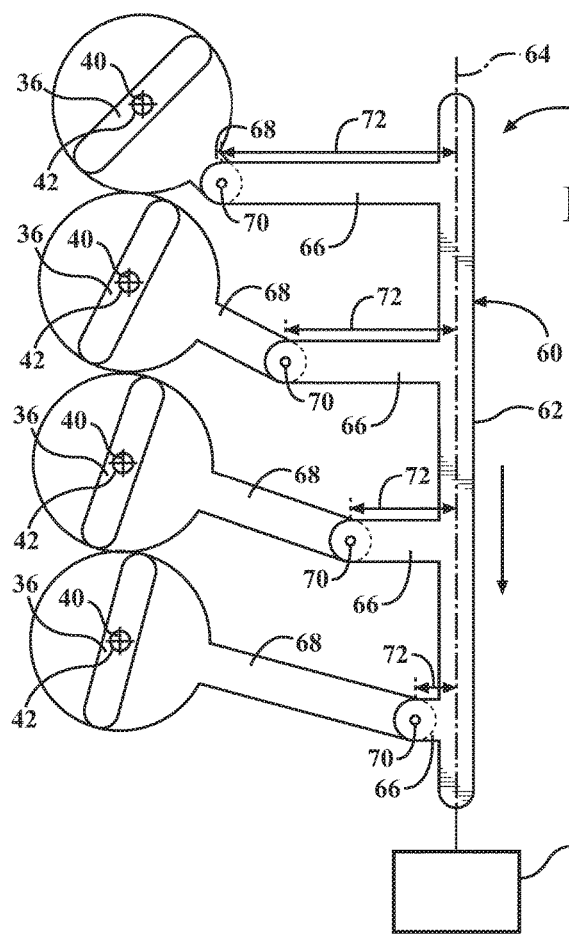
FIG. 6 is a schematic cross sectional view of the first embodiment of the actuation system showing the shutter system in a second position.
Figure 7:
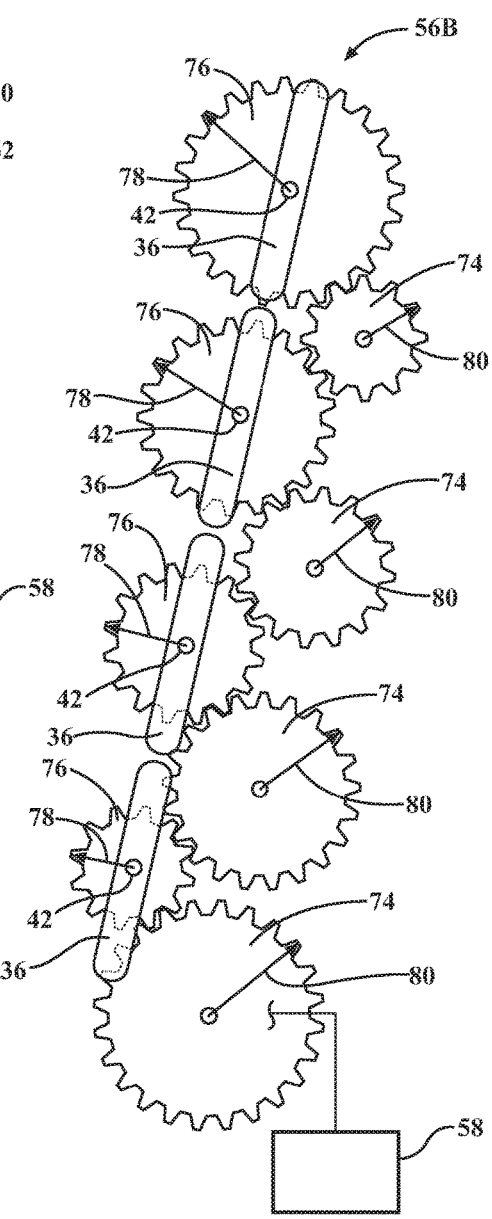
FIG. 7 is a schematic cross sectional view of the shutter system showing a second embodiment of an actuation system for actuating the shutter system.
Figure 8:
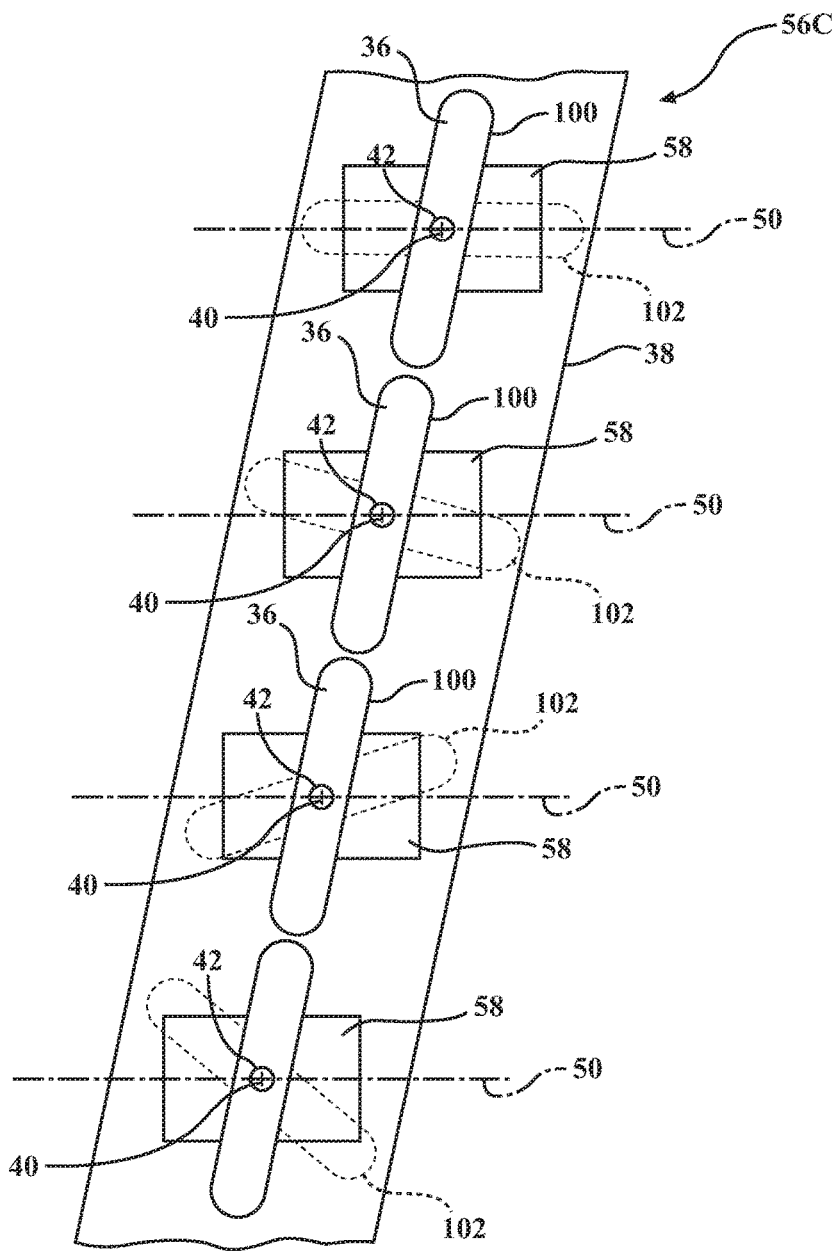
FIG. 8 is a schematic cross sectional view of the shutter system showing a third embodiment of an actuation system.

The shutter system 34 includes an actuation system 56 that is operable to move the shutters 36 between their respective positions. The actuation system 56 may include at least one actuator 58 that is coupled to at least one of the shutters 36. The actuation system 56 may further include a linkage system 60 interconnecting the shutters 36 for simultaneously moving all of the plurality of shutters 36. The actuator 58 is coupled to the linkage system 60 and is selectively operable for moving the linkage system 60, and thereby moving all of the shutters 36 simultaneously. For example, referring to FIGS. 5-8, exemplary embodiments of the actuation system 56 are generally shown. Referring to FIGS. 5 and 6, a first embodiment of the actuation system is generally shown at 56A. Referring to FIG. 7, a second embodiment of the actuation system is generally shown at 56B. Referring to FIG. 8, a third embodiment of the actuation system is generally shown at 56C. The actuation system 56 is referred to generally by the reference numeral 56, while the first, second, and third embodiments of the actuation system 56 are referred to specifically by the references numerals 56A, 56B, and 56C respectively, Referring to FIGS. 5 and 6, the first embodiment of the actuation system 56A includes a main link 62 extending along a bar axis 64, and having a separate shutter link 66 extending from the main link 62 toward each respective shutter 36. The actuator 58 is attached to the main link 62, and is operable to move the main link 62 back and forth along the bar axis 64. Each shutter link 66 may be pivotably connected to the main link 62. Each of the shutters 36 includes a respective shutter arm 68 extending toward their respective shutter link 66. The shutter arm 68 and the shutter link 66 for each respective shutter 36 are pinned at a respective pivot point 70. The pivot point 70 for each respective shutter 36 is spaced a pivot distance 72 from the bar axis 64. The pivot distance 72 determines the angle of rotation 54 of each respective shutter 36 about their respective rotation axis 40, for a given amount of movement of the main link 62 along the bar axis 64. Accordingly, a longer pivot distance 72 will provide a greater angle of rotation 54 than a small pivot distance 72. In so doing, the amount of rotation of each individual shutter 36 about their respective rotation axis 40 may be controlled so that the respective second angle 52 of each shutter 36 is different from each other. FIG. 5 shows the shutters 36 in their respective first positions 100, whereas FIG. 6 shows the shutters 36 in their respective second positions 102. While not shown, it should be appreciated that the third position 104 of the shutters 36 would be between the first positions 100 shown in FIG. 5, and the second positions 102 shown in FIG. 6.

Referring to FIG. 7, the second embodiment of the actuation system 56B includes an idler gear 74 in meshing engagement with and interconnecting an adjacent pair of shutters 36. Each of the shutters 36 is equipped with a shutter gear 76 having a shutter gear radius 78. As shown in the exemplary embodiment of the second embodiment of the actuation system 56B, each of the shutter gears 76 defines a different shutter gear radius 78, with the shutter gear radius 78 of each shutter gear 76 decreasing in succession from top downward as viewed on the page. Each of the idler gears 74 includes an idler gear radius 80. As shown in the exemplary embodiment of the second embodiment of the actuation system 56B, each of the idler gears 74 defines a different idler gear radius 80, with the idler gear radius 80 of each idler gear 74 increasing in succession from top downward as viewed on the page. The actuator 58 is attached to a lowermost shutter gear 76, and is operable to rotate the lowermost shutter gear 76 about its respective rotation axis 40. The meshing engagement between the shutter gears 76 and the idler gears 74 transfers rotation therebetween. The different idler gear radius 80 and shutter gear radius 78 of the respective meshing idler gears 74 and shutter gears 76 defines a gear ratio, that is different between each meshing shutter gear 76 and idler gear 74, thereby rotating the respective shutters 36 at different rotational angles to provide a different angle of rotation 54 for each of the shutters 36.

Referring to FIG. 8, the third embodiment of the actuation system 56C includes a plurality of actuators 58, with each actuator 58 coupled to a respective one of the plurality of shutters 36 for moving that respective shutter 36. Each individual actuator 58 controls only a single shutter 36. Accordingly, each of the shutters 36 may be moved independently of each other. As such, the shutters 36 do not need to be moved simultaneously. FIG. 8 shows the shutters 36 in their respective first positions 100 in solid lines and shows their respective second positions 102 in phantom. While not shown, it should be appreciated that the third position 104 of the shutters 36 would be between the first positions 100 and the second positions 102 shown in FIG. 8. While exemplary embodiments of the actuation system 56 have been shown and described herein for descriptive purposes, it should be appreciated that the actuation system 56 may differ from the exemplary embodiments shown and described herein.

Referring to FIG. 2, the shutter system 34 further includes a cooling module controller 82 that is operatively connected to the plurality of shutters 36 for controlling the actuator(s) 58 of the shutter system 34 to control movement of the plurality of shutters 36. The cooling module controller 82 may alternatively be referred to as a computer, a vehicle 20 controller, a control module, a vehicle 20 control module, etc. For example, the cooling module controller 82 may be referred to as an engine control unit, an engine control module, a powertrain control module, or by some other name.

The cooling module controller 82 may include a computer and/or processor, and include all software, hardware, memory, algorithms, connections, sensors, etc., necessary to manage and control the operation of the shutter system 34. As such, a method, described below may be embodied as a program or algorithm operable on the cooling module controller 82. It should be appreciated that the cooling module controller 82 may include any device capable of analyzing data from various sensors, comparing data, making the necessary decisions required to control the operation of the shutter system 34 and executing the required tasks necessary to control the operation of the shutter system 34.

The cooling module controller 82 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller includes tangible, non-transitory memory 84 on which are recorded computer-executable instructions, including a shutter control algorithm 86. The processor of the controller is configured for executing the shutter control algorithm 86. The shutter control algorithm 86 implements a method of controlling the shutter system 34. The method of controlling the shutter system 34 includes determining if the vehicle 20 is currently operating in a first state, or a second state. In some embodiments, the cooling module controller 82 may further determine if the vehicle 20 is operating in a third state.

The first vehicle operating state may be defined as vehicle operation that is optimized or improved with the shutters 36 positioned in their respective first position 100. As noted above, the first position 100 may be defined as, but is not required to be, a closed state for blocking airflow through the air inlet 24. Accordingly, vehicle 20 operations related to the first state may include, but are not limited to, situations that may require rapid heating of the vehicle 20 and/or cabin temperature. As such, the first vehicle operating state may include, for example, a low ambient air temperature and/or a low engine coolant temperature.

The second vehicle operating state may be defined as vehicle operation that is optimized or improved with the shutters 36 positioned in their respective second position 102. As noted above, the second position 102 may be defined as, but is not required to be, a fully opened state that directs airflow through the air inlet 24 to the first region 44 of the cooling module 26. If the first region 44 of the cooling module 26 includes a sub-cooling region of the condenser 30, then vehicle 20 operations related to the second state may include, but are not limited to, situations that may require rapid cooling of the cabin air temperature. As such, the second vehicle operating state may include, for example, a high ambient air temperature and/or a high cabin air temperature.

The third vehicle operating state may be defined as vehicle operation that is optimized or improved with the shutters 36 positioned in their respective third position 104. As noted above, the third position 104 may be defined as, but is not required to be, a state that directs airflow through the air inlet 24 to the second region 46 of the cooling module 26. If the second region 46 of the cooling module 26 includes the charged air cooler, then vehicle 20 operations related to the third state may include, but are not limited to, situations related to sport or race driving. As such, the third vehicle operating state may include, for example, a wide open throttle.

The cooling control module may determine the current operating state of the vehicle 20, e.g., the first state, the second state, or the third state, in any suitable manner. For example, the cooling control module may analyze data from one or more vehicle 20 sensors, such as ambient air temperature sensors, cabin air temperature sensors, speed sensors, throttle position sensors, etc. The cooling control module may determine the current vehicle operating state from the data from the various sensors. Alternatively, other vehicle 20 systems may provide the data to the cooling control module and/or communicate the specific vehicle 20 state to the cooling control module through vehicle 20 communication networks.

Once the cooling module controller 82 determines the current operating state of the vehicle 20, e.g., the first state, the second state, or the third state, then the cooling module controller 82 controls the shutters 36 of the shutter system 34 into their appropriate position for optimizing vehicle 20 performance for the current vehicle operating state. As such, when the vehicle 20 is currently operating in the first state, the cooling module controller 82 controls the shutters 36 into their respective first position 100. When the vehicle 20 is currently operating in the second state, the cooling module controller 82 controls the shutters 36 into their respective second position 102. Similarly, when the vehicle 20 is currently operating in the third state, the cooling module controller 82 controls the shutters 36 into their respective third position 104. The cooling module controller 82 may control the shutter system 34, for example, by sending an electrical signal to the actuator(s) 58 of the shutter system 34, which engages the actuator(s) 58 to move the shutters 36 into the requested and appropriate system.

It should be appreciated that positioning one or more of the shutters 36 at different angles relative to the reference axis 50 improves the control of the airflow onto the cooling module 26, which thereby improves the cooling performance of the cooling module 26. The respective orientation of each of the shutters 36 relative to the reference axis 50 may be designed to improve airflow across the entirety of the cooling module 26. For example, the shutters 36 may only be moveable between their respective first position 100 and second position 102, with the first position 100 blocking airflow through the air inlet 24, and the second position 102 allowing airflow through the air inlet 24. In such a configuration, the second angle 52 of each respective shutter 36 may be defined to improve airflow across the entire cooling module 26.

Alternatively, the respective orientation of each of the shutters 36 relative to the reference axis 50 may be designed to improve performance of a specific region of the cooling module 26 for a specific vehicle operating state. For example, the shutters 36 may be moveable between the first position 100, the second position 102, and the third position, with the first position 100 blocking airflow through the air inlet 24 when the vehicle 20 is currently operating in the first state, the second position 102 allowing airflow through the air inlet 24 and directing the airflow onto the first region 44 of the cooling module 26 when the vehicle 20 is currently operating in the second state, and the third position 104 allowing airflow through the air inlet 24 and directing the airflow onto the second region 46 of the cooling module 26 when the vehicle 20 is currently operating in the third state. In such a configuration, the second angle 52 of each respective shutter 36 may be defined to improve airflow to the first region 44 of the cooling module 26, and the third angle of each respective shutter 36 may be defined to improve airflow to the second region 46 of the cooling module 26.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
  a body defining an air inlet;
  a plurality of shutters coupled to the body, with each of the plurality of shutters rotatably moveable about a respective rotation axis;
  wherein at least one of the plurality of shutters is positionable at a different angle relative to its respective rotation axis relative to a position of at least one other of the plurality of shutters relative to its respective rotation axis;
  a linkage system interconnecting the plurality of shutters for simultaneously moving all of the plurality of shutters, the linkage system including:
    a main link defining a bar axis and moveable along the bar axis;
    a plurality of shutter links, with each respective one of the plurality of shutter links connected to the main link and extending from the main link toward a respective one of the plurality of shutters;
    a plurality of shutter arms, with each respective shutter arm connected to a respective one of the plurality of shutters and a respective one of the plurality of shutter links at a respective pivot point;
    wherein each respective pivot point is spaced a pivot distance from the bar axis; and
    wherein the pivot distance of at least one of the respective pivot points is different from the pivot distance of at least another one of the respective pivot points.

2. The vehicle set forth in claim 1, wherein each of the plurality of shutters is moveable between at least a first position and a second position, wherein each of the plurality of shutters defines a first angle relative to a reference axis when disposed in its respective first position, and a second angle relative to the reference axis when disposed in its respective second position.

3. The vehicle set forth in claim 2, wherein the second angle of at least one of the plurality of shutters is different than the second angle of at least another of the plurality of shutters to direct airflow in different directions relative to the reference axis.

4. The vehicle set forth in claim 3, wherein the second angle of each of the plurality of shutters is different than the second angle of any other of the plurality of shutters.

5. The vehicle set forth in claim 1, further comprising an actuator coupled to the linkage system and selectively operable for moving the linkage system.

6. The vehicle set forth in claim 3, wherein the first angle of each of the plurality of shutters is substantially equal to the first angle of all other of the plurality of shutters.

7. The vehicle set forth in claim 3, wherein each of the plurality of shutters is rotatable about its respective rotation axis to a third position, and wherein each of the plurality of shutters define a third angle relative to the reference axis when disposed in their respective third position.

8. The vehicle set forth in claim 7, wherein the respective first position for each of the plurality of shutters is a closed position for blocking airflow through the air inlet, the respective second position for each of the plurality of shutters is a fully open position for allowing maximum airflow through the air inlet, and the respective third position for each of the plurality of shutters is a partially open position for allowing reduced airflow through the air inlet.

9. The vehicle set forth in claim 1, further comprising a cooling module including at least one of a radiator, a condenser, and a charge air cooler.

10. The vehicle set forth in claim 3, wherein the plurality of shutters control airflow through the cooling module, such that a first group of the plurality of shutters directs airflow toward a respective first region of the cooling module when disposed in their respective second position, and a second group of the plurality of shutters directs airflow toward a respective second region of the cooling module when disposed in their respective second position.

11. The vehicle set forth in claim 2, wherein each of the plurality of shutters rotates about its respective rotation axis a respective angle of rotation when moving between its respective first position and second position, and wherein the angle of rotation of at least one of the plurality of shutters is different than the angle of rotation of another of the plurality of shutters.

12. The vehicle set forth in claim 2, further comprising a cooling module controller operatively connected to the plurality of shutters for controlling movement of the plurality of shutters, wherein the cooling module controller includes a processor and non-transitory memory on which is recorded a shutter control algorithm, wherein the processor is operable to execute the shutter control algorithm to:
   determine if the vehicle is currently operating in a first state or in a second state;
   position the plurality of shutters in their respective first position when the vehicle is currently operating in the first state to optimize performance in the first state; and
   position the plurality of shutters in their respective second position when the vehicle is currently operating in the second state to optimize performance in the second state.

13. The vehicle set forth in claim 1, wherein the pivot distance of each respective pivot point is different from the pivot distance of all other of the pivot points.

14. The vehicle set forth in claim 1, wherein axial movement of the main link along the bar axis rotates each of the plurality of shutters a respective angle of rotation that is dependent upon the respective pivot distance of each respective shutter.

15. The vehicle set forth in claim 1, further comprising an actuator coupled to the main link, and operable to move the main link along the bar axis.

* * * * *